United States Patent
Defraene et al.

(10) Patent No.: US 11,315,587 B2
(45) Date of Patent: Apr. 26, 2022

(54) SIGNAL PROCESSOR FOR SIGNAL ENHANCEMENT AND ASSOCIATED METHODS

(71) Applicant: GOODIX TECHNOLOGY (HK) COMPANY LIMITED, Hong Kong (HK)

(72) Inventors: Bruno Gabriel Paul G. Defraene, Blanden (BE); Nilesh Madhu, Kessel-Lo (BE); Wouter Joos Tirry, Wijgmaal (BE)

(73) Assignee: GOODIX TECHNOLOGY (HK) COMPANY LIMITED, Hong Kong (CN)

( * ) Notice: Subject to any disclaimer, the term of this patent is extended or adjusted under 35 U.S.C. 154(b) by 862 days.

(21) Appl. No.: 16/143,601

(22) Filed: Sep. 27, 2018

(65) Prior Publication Data

US 2019/0122685 A1 Apr. 25, 2019

(30) Foreign Application Priority Data

Oct. 19, 2017 (EP) .................................. 17197360

(51) Int. Cl.
*G10L 21/0216* (2013.01)
*G10L 21/0264* (2013.01)
(Continued)

(52) U.S. Cl.
CPC ........ *G10L 21/0216* (2013.01); *G06N 3/0445* (2013.01); *G06N 3/0454* (2013.01);
(Continued)

(58) Field of Classification Search
CPC . G10L 21/0216; G10L 21/02; G10L 21/0264; G10L 25/30; G10L 2021/02166;
(Continued)

(56) References Cited

U.S. PATENT DOCUMENTS 5,335,312 A 8/1994 Mekata et al.
5,856,970 A * 1/1999 Gee .................... H03H 21/0012
370/286

(Continued)

OTHER PUBLICATIONS

Schwarz, Andreas et al; "Spectral Feature-Based Nonlinear Residual Echo Suppression"; Proc. IEEE WASPAA 2013, New Paltz, NY, USA; 4 pages (2013).

(Continued)

*Primary Examiner* — Lisa Hashem
(74) *Attorney, Agent, or Firm* — Scully Scott Murphy & Presser (57) ABSTRACT

A signal processor for performing signal enhancement, the signal processor comprising: an input-terminal, configured to receive an input-signaling; an output-terminal; an interference-cancellation-block configured to receive the input-signaling and to provide an interference-estimate-signaling and an interference-cancelled-signal based on the input-signaling. The signal processor further comprises a feature-block configured to provide a combination-feature-signal based on the interference-cancelled-signal and the interference-estimate-signaling; and a neural-network-block configured to apply model parameters to the combination-feature-signal to provide a neural-network-output-signal to the output-terminal.

16 Claims, 3 Drawing Sheets

(51) Int. Cl.
*G06N 20/00* (2019.01)
*G10L 21/02* (2013.01)
*H04R 3/00* (2006.01)
*G06N 3/04* (2006.01)
*G06N 3/08* (2006.01)
*G10L 21/0208* (2013.01)
*G10L 25/30* (2013.01)

(52) U.S. Cl.
CPC ............... *G06N 3/08* (2013.01); *G06N 20/00* (2019.01); *G10L 21/02* (2013.01); *G10L 21/0264* (2013.01); *H04R 3/005* (2013.01); *G10L 25/30* (2013.01); *G10L 2021/02082* (2013.01); *G10L 2021/02087* (2013.01); *G10L 2021/02166* (2013.01)

(58) Field of Classification Search
CPC ........... G10L 2021/02082; G10L 2021/02087; H04R 3/005; H04R 2499/11; H04R 3/02; G06N 3/0445; G06N 3/08; G06N 3/0454; G06N 20/00
See application file for complete search history.

(56) References Cited

U.S. PATENT DOCUMENTS

| | | | |
|---|---|---|---|
| 2001/0021905 A1* | 9/2001 | Burnett | A61B 5/0507 704/233 |
| 2007/0189507 A1* | 8/2007 | Tittle | H04M 9/082 379/406.01 |
| 2011/0194719 A1* | 8/2011 | Frater | H04R 27/00 381/332 |
| 2016/0078880 A1 | 3/2016 | Avendano et al. | |
| 2016/0358602 A1* | 12/2016 | Krishnaswamy | G10L 15/20 |
| 2016/0358619 A1* | 12/2016 | Ramprashad | G10L 15/20 |
| 2018/0024811 A1* | 1/2018 | De Vaan | H04W 12/08 704/275 |
| 2018/0130482 A1* | 5/2018 | Michel | G10L 21/0232 |
| 2019/0172476 A1* | 6/2019 | Wung | G10L 21/0364 |
| 2020/0312346 A1* | 10/2020 | Fazeli | G06N 20/10 |
| 2021/0018582 A1* | 1/2021 | Liu | G01R 33/243 |
| 2021/0035595 A1* | 2/2021 | Takahashi | G10L 21/0232 |
| 2021/0065731 A1* | 3/2021 | Matsukawa | H04R 1/1083 |

OTHER PUBLICATIONS

Chhetri, Amit S. et al; "Regression-Based Residual Acoustic Echo Suppression"; Proc. IWAENC, vol. 5; 4 pages (Sep. 12-15, 2005).

Xu, Y. et al; "A Regression Approach to Speech Ehancement Based on Deep Neural Networks"; IEEE/ACM Transactions on Audio, Speech and Language Processing, vol. 23, No. 1; pp. 7-19 (Jan. 2015).

Enzner, Gerald et al; "Acoustic Echo Control"; Academic Press Library in Signal Processing, vol. 4, Image Video Processing and Analysis, Hardware, Audio, Acoustic and Speech Processing; 72 pages (2014).

Kingma, Diederik P. et al; "ADAM: A Method for Stochastic Optimization"; published as a conference paper at ICLR 2015; retreived from the internet https://arxiv.org/abs/1412.6980; 15 pages (2015).

Kobatake, Hidefumi et al; "Super Directive Sensor Array with Neural Network Structure"; Speech Processing 1, San Francisco, CA Mar. 23-26, 1992, US, IEEE Proceedings of the International Conference on Acoustics, Speech and Signal Processing, New York, New York, US vol. 2; pp. 321-324 (Mar. 23, 1992).

Lee, Seung Yeol et al; "A Statistical Model-Based Residual Echo Suppression"; IEEE Signal Processing Letters, vol. 14, No. 10; (Oct. 2007).

* cited by examiner

SIGNAL PROCESSOR FOR SIGNAL ENHANCEMENT AND ASSOCIATED METHODS

CROSS-REFERENCE TO RELATED APPLICATIONS

This application claims the priority under 35 U.S.C. § 119 of European patent application no. 17197360.5, filed Oct. 19, 2017 the contents of which are incorporated by reference herein.

The present disclosure relates to apparatus and methods for signal enhancement, and in particular, although not necessarily, to apparatus and methods for speech signal enhancement.

According to a first aspect of the present disclosure there is provided a signal processor for performing signal enhancement, the signal processor comprising: an input-terminal, configured to receive an input-signalling; an output-terminal; an interference-cancellation-block configured to receive the input-signalling and to provide an interference-estimate-signalling and an interference-cancelled-signal based on the input-signalling; a feature-block configured to provide a combination-feature-signal based on the interference-cancelled-signal and the interference-estimate-signalling; and a neural-network-block configured to apply model parameters to the combination-feature-signal to provide a neural-network-output-signal to the output-terminal.

In one or more embodiments, the feature-block may be configured to determine the combination-feature-signal by concatenating: a noise-signal representative of the interference-estimate-signalling; and a clean-signal representative of the interference-cancelled-signal.

In one or more embodiments, the noise-signal may comprise spectral coefficients of the interference-estimate-signalling.

In one or more embodiments, the clean-signal may comprise spectral coefficients of the interference-cancelled-signal.

In one or more embodiments, the noise-signal may comprise a logarithm of one or more spectral components of the interference-estimate-signalling.

In one or more embodiments, the clean-signal may comprise a logarithm of one or more spectral components of the interference-cancelled-signal.

In one or more embodiments, the neural-network-output-signal may comprise an estimated-clean-signal or may represent a gain function or underlying clean signal features.

In one or more embodiments, the interference-cancellation-block may comprise an echo cancellation block or a beamformer.

In one or more embodiments, the interference-estimate-signalling and the interference-cancelled-signal may both be time-domain signals.

In one or more embodiments, the input-signalling may comprise a signal-frame, and the feature-block may be configured to determine the combination-feature-signal for the input-signalling based on information representative of: one or more earlier-signal-frames; and/or one or more later-signal-frames.

In one or more embodiments, the signal processor may further comprise a second-input-terminal configured to receive a second-input-signal, wherein the interference-cancellation-block may be configured to provide both the interference-estimate-signalling and the interference-cancelled-signal based on both the input-signalling and the second-input-signal.

In one or more embodiments, the signal processor may further comprise a second-input-terminal configured to receive a second-input-signal, wherein: the interference-cancellation-block may be configured to determine a second-interference-estimate-signalling and a second-interference-cancelled-signal based on the second-input-signal; and the feature-block may be configured to provide the combination-feature-signal by combining signalling representative of: the interference-estimate-signalling; the interference-cancelled-signal; the second-interference-estimate-signalling; and the second-interference-cancelled-signal.

In one or more embodiments, the neural network model parameters may be pre-determined based on a comparison of a plurality of signal pairs, each signal pair comprising: an input-feature-signal, comprising training-interference-estimate-signalling and a training-interference-cancelled-signal; and an output-feature-signal representative of a desired-neural-network-output-signal.

In one or more embodiments, the plurality of signal pairs may comprise signal pairs representative of one or more of: speech signals provided by one or more talkers; one or more types of interference signals; one or more ratios between clean-signals and interference-signals; one or more electronic audio devices; and one or more acoustic environments.

In one or more embodiments, the signal processor may further comprise a synthesis block configured to receive the neural-network-output-signal and the interference-cancelled-signal and to provide a reduced-interference-signal based on magnitudes of the neural-network-output-signal and optionally on phases of the interference-cancelled-signal.

In one or more embodiments, the input-signalling comprises a speech signal, and the signal processor further comprises a speech-block configured to provide a desired speech-feature-signal based on the neural-network-output-signal.

In one or more embodiments, the neural-network-block may be configured to apply a non-linear transformation to the combination-feature-signal in order to determine the neural-network-output-signal.

In one or more embodiments, the neural-network-block may comprise one or more of: a feedforward neural network; a recurrent neural network; a long short-time memory neural network; and a convolutional neural network.

In one or more embodiments, the signal processor may further comprise a feature pre-processing block that is configured to apply normalization per feature dimension of the combination-feature-signal.

In one or more embodiments, an integrated circuit or an electronic device may comprise any signal processor disclosed herein.

In one or more embodiments, a computer program, which when run on a computer, may cause the computer to configure any signal processor disclosed herein.

According to a further aspect of the present disclosure there is provided a method for performing signal enhancement, the method comprising: receiving input-signalling; providing an interference-estimate-signalling and an interference-cancelled-signal based on the input-signalling; providing a combination-feature-signal based on the interference-cancelled-signal and the interference-estimate-signalling; and using a neural-network to apply model parameters to the combination-feature-signal to provide a neural-network-output-signal.

In one or more embodiments, the model parameters may be provided by comparing a plurality of signal pairs, each of the signal pairs comprising: an input-feature-signal, comprising a clean-signal and interference signalling; and an output-feature-signal representative of the clean-signal.

In one or more embodiments, the plurality of speech pairs may comprise signal pairs representative of one or more of: speech signals provided by one or more talkers; one or more types of interference signals; one or more ratios between the clean-signals and the interference-signalling; one or more electronic audio devices; and one or more acoustic environments.

In one or more embodiments, the plurality of speech pairs may comprise signal pairs representative of one or more of: speech signals provided by a particular talker; a particular type of interference signal; a particular ratio between clean-signals and interference-signals; a particular electronic audio device; and a particular acoustic environment.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which.

The present disclosure relates to the problem of providing signal enhancement, where a desired signal is contaminated with an undesired noise or interference component. A particular example of this problem includes removing unwanted echoes from a speech signal.

In full-duplex speech communication systems, as well as automatic speech recognition (ASR) systems, acoustical echoes can arise due to the coupling between the loudspeaker(s) and the microphone(s) of an audio device. In speech communication systems, such audible acoustic echoes can be perceived as annoying and can degrade the quality and intelligibility of a transmitted speech signal. In speech recognition systems, the presence of acoustic echoes can significantly degrade the performance of the ASR or of a keyword recognition system. The adequate removal of such undesired acoustic echoes from speech signals (which can be termed acoustic echo control) is a challenging and long-standing problem in speech signal processing.

Figure 1:
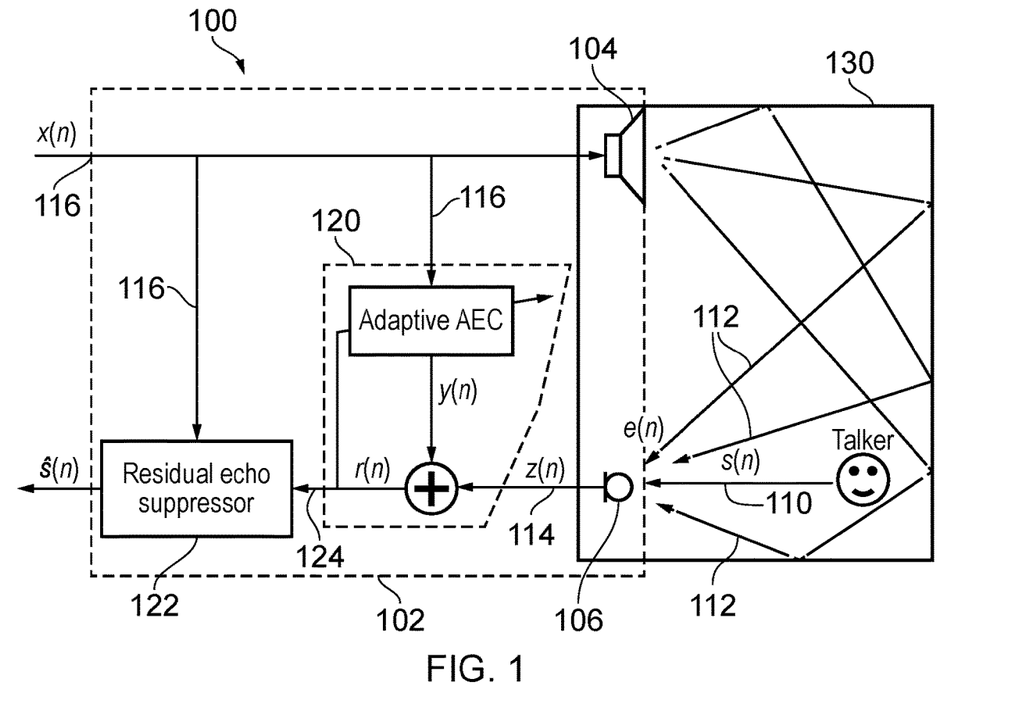
FIG. 1 shows an example of a signal enhancement system.

FIG. 1 shows an acoustic echo control configuration 100, for the basic scenario of an audio device 102 with a single loudspeaker 104 and a single microphone 106. The device microphone 106 picks up a mixture of a desired speech signal $s(n)$ 110 and an undesired echo signal $e(n)$ 112, due to the playback through the device loudspeaker 104. A goal of acoustic echo control algorithms is to estimate an echo-free desired speech signal from the observed microphone signal $z(n)$ 114, based on knowledge of an echo reference signal $x(n)$ 116. In this example the echo reference signal $x(n)$ 116 is representative of a signal that drives the loudspeaker 104. The acoustic echo control approach consists of two distinct processing stages: an initial adaptive echo cancellation (AEC) stage 120, and a subsequent residual echo suppression (RES) stage 122, both of which will be discussed further below.

The AEC stage 120 performs an adaptive filtering operation, where the goal is to model the loudspeaker-room-microphone acoustic echo path, in the loudspeaker-enclosure-microphone system 130, by means of a linear or nonlinear filter. Adaptation of the filter coefficients can be performed by various adaptive algorithms, such as least-mean-square (LMS), normalized least-mean-square (NLMS), Recursive Least-Square (RLS), Frequency Domain Adaptive Filtering (FDAF), Affine Projection Algorithm (APA), or adaptation algorithms for Volterra filters, Wiener systems or Hammerstein systems. Algorithm choice depends on providing for an acceptable trade-off between application requirements, computational complexity and convergence speed. The AEC stage 120 provides a residual signal $r(n)$ 124, which is an example of an interference cancelled signal, for the RES stage 122.

The residual signal $r(n)$ 124 provided by the AEC stage 120 will typically not be echo-free but still contain a significant amount of undesired residual echo. Some possible reasons for these residual echoes can include any one or more of: mismatch between the actual acoustic echo path and the estimated acoustic echo path, insufficient tracking capability of the adaptation algorithm, and generation of nonlinear echoes in small low-quality loudspeakers or in overpowered amplifiers. These effects can all contribute to a considerable degradation of the AEC stage 120 performance and the resulting existence of significant levels of undesired residual echo in the residual signal $r(n)$ 124.

The residual echo suppression (RES) stage 122 aims to further reduce any residual echo present in the residual signal $r(n)$ 124. RES techniques may try to estimate the power spectral density (PSD) of the residual echo, and remove this using a form of gain function, for example by using a Wiener filter or spectral subtraction techniques. Certain RES approaches come with several limitations and disadvantages, some non-limiting examples of which are set out below.

High speech attenuation: RES methods can be aggressive in the sense that they can reduce the residual echo further at the expense of introducing speech distortions during speech activity. These speech distortions can degrade speech quality and intelligibility in speech communication systems, or degrade the performance of the recognition in ASR systems.

Inaccurate modelling of nonlinear echo: if the AEC stage 120 consists of a linear filter only, no estimation of the nonlinear echo components can be performed and the nonlinear echoes will need to be suppressed in the RES. If the AEC stage 120 consists of a nonlinear filter, these nonlinear echoes can be at least partly estimated by the AEC stage 120, yet this comes at the cost of potential filter stability and convergence issues. In both cases, nonlinear echo reduction can advantageously be tackled in the subsequent RES stage 122. However, RES models may not be powerful enough to effectively model the complex interplay of nonlinear mechanisms in a loudspeaker-enclosure-microphone system 130.

Lack of robustness in handsfree scenarios: in the handsfree scenario where a talker does not hold their audio device next to their head, the two disadvantages listed above are emphasized and even more detrimental to the speech quality. First, the speech-to-echo (SER) ratio is much lower than in handset mode, both due to the louder echo level (higher loudspeaker playback level, since the talker may not hold the loudspeaker 104 next to their ear) as well as due to the softer speech level (higher talker-to-device distance, since the talker may not hold the microphone 106 next to their mouth). Removing these loud echoes using a traditional RES approach often results in unacceptable speech attenuations. Second, the loudspeaker 104 is often driven to its limits which can result in higher levels of nonlinear echoes, which may not be modelled well enough by the RES stage 122 to be able to remove echoes without introducing problematic speech attenuations.

Figure 2:
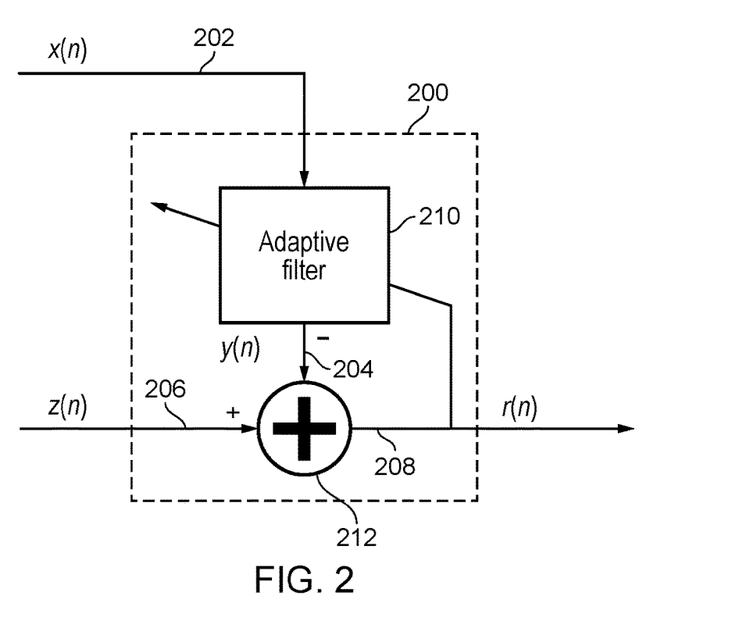
FIG. 2 shows an example of an adaptive linear filter, similar to a filter used in the system of FIG. 1.

FIG. 2 shows a schematic diagram of an adaptive echo cancellation (AEC) stage 200 similar to the AEC stage shown in FIG. 1. The AEC stage 200 is configured to perform an adaptive filtering operation, where a loudspeaker-enclosure-microphone acoustic echo path is modelled by an adaptive, linear or nonlinear, filter block 210. The filter block 210 receives an echo reference signal x(n) 202 and determines an echo estimate signal y(n) 204. The echo estimate signal y(n) 204 is subtracted from a microphone signal z(n) 206 by a combiner block 212. The combiner block 212 thereby provides a residual signal r(n) 208, which is output to the next stage of the filtering process (not shown) and is also fed back to the filter block 210 so that the filter coefficients of the filter block 210 can be appropriately adapted.

In this embodiment, the filter block 210 comprises an adaptive finite impulse response (FIR) filter. The adaptive filter used by the filter block 210 can be represented as a=[a(0), a(1), . . . , a(R−1)], since in this example the filter has a length of R taps. Filter coefficient adaptation can be performed, for example, by using the Normalized Least Mean Squared (NLMS) update rule, such as:

$$a(n+1) = a(n) + \gamma(n)\frac{r(n)x(n)}{x^T(n)x(n)}$$

where the adaptation step size γ(n) is time-dependent; the residual signal r(n) 208 is defined as $$r(n)=z(n)-y(n)$$

and the echo estimate signal y(n) 204 is defined as $$y(n)=a^T(n)x(n)$$

Here, X(n)=[x(n), x(n−1), . . . , x(n−R+1)] is the vector storing the most recent echo reference signal samples.

In other examples, adaptation of the filter coefficients can be performed by other adaptive algorithms than the NLMS, for example by using any of Recursive Least-Square (RLS), Frequency Domain Adaptive Filtering (FDAF) or Affine Projection Algorithms (APA). An adaptive nonlinear filter structure and update rule such as, for example, the Volterra filter could be applied in this stage instead of a linear adaptive filter.

In another embodiment, which could be relevant to a multi-loudspeaker audio device (not shown), a multichannel adaptive AEC can be used to estimate the acoustic echo paths from each loudspeaker to a microphone. The resulting estimated echo signals can be combined and then subtracted from the microphone signal. As in the case of a single loudspeaker, a multichannel adaptive AEC can yield one residual signal (r(n)) and one combined echo estimate signal (y(n)).

Figure 3:
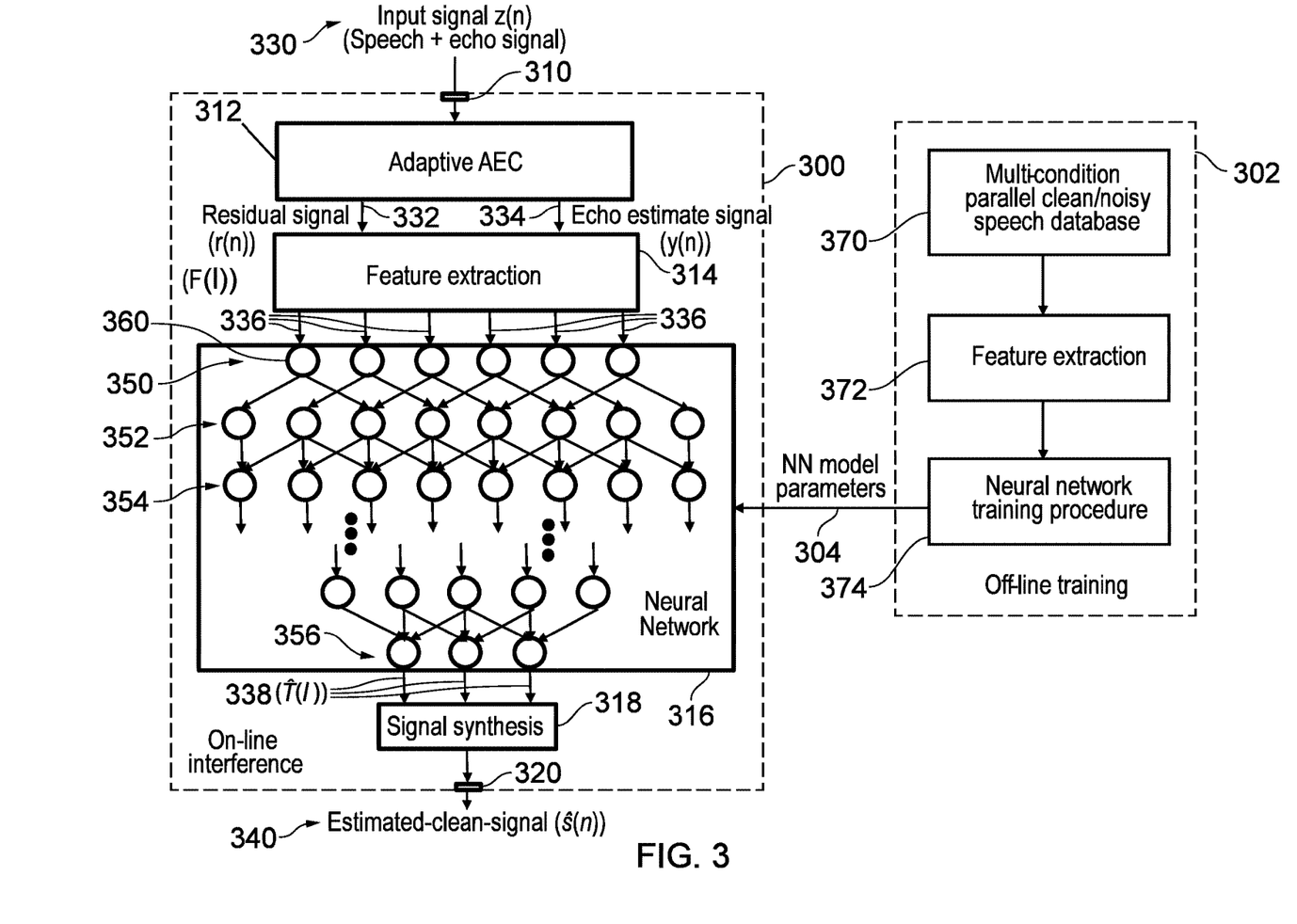
FIG. 3 shows an example embodiment of a signal processor configured to perform signal enhancement with a neural network.

FIG. 3 shows a schematic overview of a signal processor 300 that uses an adaptive echo cancellation stage 312 and a neural network block 316 to reduce interference in an input signal z(n) 330. In some examples, the input signal z(n) 330 can be a speech signal contaminated with an echo signal. The signal processor 300 can thereby provide an estimated-clean-signal ŝ(n) 340 as an output signal, which can be considered as a clean, echo-free or echo-reduced, speech signal. The estimated-clean-signal ŝ(n) 340 is an example of a neural-network-output-signal. Other types of neural-network-output-signal will be discussed further below.

FIG. 3 also illustrates a method 302 for setting model parameters 304 of the neural network block 316. The method 302 can be performed off-line, and the parameters 304 can be used to program the neural network block 316 before the signal processor 300 is deployed for use. Further details of both the signal processor 300 and the method 302 will be described in greater detail below.

The signal processor 300 has an input terminal 310 for receiving an input signal z(n) 330, which can be a microphone signal that comprises both desired speech signal components and undesired echo components. The input terminal 310 provides the input signal z(n) 330 to an adaptive echo cancellation block 312, which is an example of an interference-cancellation-block. In other examples, the echo cancellation block 312 may not be adaptive. In some examples, an interference-cancellation-block may comprise a beamformer and/or a single-channel noise suppressor.

The adaptive echo cancellation block 312 can receive the input-signal z(n) 330 and provide both: (i) an echo estimate signal y(n) 334, which is an example of an interference-estimate-signal; and (ii) a residual signal r(n) 332, which is an example of an interference-cancelled-signal. Both the echo estimate signal y(n) 334 and the residual signal r(n) 332 are based on the input-signal z(n) 330, and are provided to a feature-block 314. The input-signal z(n) 330 is an example of input-signalling, which may comprise a single signal from a single source, such as a single microphone, or multiple signals from multiple sources, such as a plurality of microphones. Similarly, the interference-estimate-signal is an example of interference-estimate-signalling, which may comprise a plurality of different component signals.

In other examples (not shown) the adaptive echo cancellation block 312 can be configured to receive an additional reference signal (in addition to the input signal z(n) 330), such as the echo reference signal x(n) discussed above in relation to FIG. 2. In such cases one or both of the residual signal r(n) 332 and the echo estimate signal y(n) 334 can also be based on the additional reference signal, or on both the additional reference signal and the input signal z(n) 330.

The feature-block 314 provides a combination-feature-signal F(I) 336 (here I is the short-time frame index), based on the residual signal r(n) 332 and the echo estimate signal y(n) 334, to the neural network block 316. In this example, the feature block 314 provides a plurality of components of the combination-feature-signal F(I) 336 to the neural network block 316.

The combination-feature-signal F(I) 336 can be a combination of the residual signal 332 with the echo estimate signal 334. The combination can be a concatenation, or any other combination such as by interleaving portions of the signals or applying a processing/mathematical operation to the two signals. Another example of the combination can be computing the combination-feature-signal as the ratio of the residual signal features and the echo estimate features, thereby yielding a residual speech-to-interference ratio. The feature block 314, and the combination-feature-signal F(I) 336, will be described in greater detail below in relation to FIG. 4.

The neural-network-block 316 is designed to apply model parameters 304 to the combination-feature-signal F(I) 336 to provide (directly or indirectly) an estimated-clean-signal ŝ(n) 340 to an output-terminal 320.

This example of the signal processor 300 also includes an optional signal synthesis block 318 between the neural network block 316 and the output terminal 320. In this example, the signal synthesis block 318 receives prediction output features T̂(l) 338 from the neural network block 316. The signal synthesis block 318 will be described in greater detail below in relation to FIG. 5. It will be appreciated that in other examples (not shown) an output signal from the neural network block 316 may be provided to the output terminal 320 without being processed by an intervening signal synthesis block. That is, the estimated-clean-signal ŝ(n) 340 can be provided directly by the neural network block 316.

In this example, the neural network block 316 is a feedforward neural network with M layers of interconnected neurons. The M layers of neurons include a first layer 350, a second layer 352, a third layer 354, and so on, up to a last layer 356. In this example, each layer comprises a plurality of neurons, such as a first neuron 360, situated in the first layer 350. A subscript notation 'm' will be used as an index to refer to the $m^{th}$ layer.

An input $h_0$ provided to the first neural network layer 350 consists of the combination-feature-signal F(I) 336 provided by the feature block 314. In this example, the combination-feature-signal F(I) 336 includes input features in the frequency domain, indexed into frames with index l. The input signalling to the first neural network layer 350 can be written as:

$$h_0 = F(l)$$

Each successive neuronal layer transforms its inputs $h_{(m-1)}$ (which are received from neurons in the preceding neuronal layer) into outputs $h_m$ through a linear transform defined by weighting matrix $W_m$ and bias vector $b_m$, succeeded by a nonlinear function $\sigma_m$, such as $$h_m = \sigma_m(W_m h_{m-1} + b_m), \text{ for } m=1,\ldots,M$$

The prediction output features T̂(l) 338 of the neural network block 316 consist of the output of the last neural network layer 356, that is:

$$\hat{T}(l) = h_M.$$

In this example, each neuron in the first layer 350 is connected to two neurons in the second layer 352. However, it will be appreciated that each neuron in the first layer 350 could be connected to any number of neurons in the second layer 352, and that similarly, any number of connections may be provided between neurons in subsequent layers.

The last layer 356 (which can be termed the output layer), provides the prediction output features T̂(l) 338 as output signals. The prediction output features T̂(l) 338 can also be referred to as predicted echo-free features T̂(l) 388. In the example of FIG. 3, the prediction output features T̂(l) 338 consist of a set of three components, however, it will be appreciated that in other examples the last neuronal layer 356 may contain a single neuron, which may produce a single prediction output, or may contain a plurality of neurons which may produce a plurality of output components.

Generally, it is possible to write $\hat{T}(l) = f_\theta(F(l))$. That is, the neural network block 316 transforms the input features of the combination-feature-signal F(I) 336 into the prediction output features T̂(l) 338 through a parametrized function f with parameters θ, where the full set of neural network parameters θ can be written concisely as:

$$\theta = \{W_1, b_1, W_2, b_2, \ldots, W_M, b_M\}.$$

The neural network parameters provided to each different neuron may be different. The parameters can be selected such that the prediction output features T̂(l) 338 provide an improved representation of a clean signal, with no, or at least reduced, interference such as echo components.

It will be appreciated that other neural network configurations than the feedforward neural network can be used for the neural network block 316, such as, for example, recurrent neural networks (RNN), long short-time memory neural networks (LSTM), or convolutional neural networks (CNN), among others.

The method 302 for providing the model parameters 304 for the neural network block 316 will now be briefly described. Further description of the method will be deferred until after the description of FIG. 6 below.

The method 302 uses a database 370 of pairs of clean and noisy signals. For each pair, the noisy signal is a combination of the clean signal with some interference, such as residual echoes or other noise present after performing the adaptive interference cancellation.

For a plurality of pairs of signals, the method involves extracting 372 a combination-feature-signal for the noisy signals, in a process similar to that described above in relation to the feature-block 314. The clean signals can be used to compute a target-feature-signal directly.

Then, the training procedure 374 is conducted in a series of sub-steps, to solve a constrained optimisation problem. For each pair of signals, a neural network (similar to that embodied by the neural network block 316) is used to process the combination-feature-signal based on the noisy signal to provide a prediction signal. The prediction signal is compared with the target-feature-signal based on the clean signal, and a difference quantity (representative of the difference between the prediction signal and the clean signal) is determined. This process can be repeated for a plurality of pairs of signals in the database 370.

After each sub-step in which pairs of signals are processed by the neural network, the neural network parameters are altered, and the processing is then repeated. Altered neural network parameters are selected to reduce the size of the difference quantity, in accordance with any constrained optimisation procedure known to those skilled in the art. In this way, neural network model parameters are developed over a series of iterations to minimize, or at least reduce to satisfy some threshold criteria, the difference between the output from the neural network and the combination-featuresignals based on the known clean signals. The resulting set of neural network model parameters 304 can then be programmed into the neural network block 316 for future use.

In some examples, the signal processor 300 can be configured to provide other examples of the neural-network-output-signal, which are not necessarily the same as the estimated-clean-signal $\hat{s}(n)$ 340. For example, the neural-network-output-signal may be a real or complex valued gain function, which when applied to an interference-cancelled-signal, or to the input-signalling, generates an interference-free, or interference-reduced, representation of a clean speech signal. In such cases, the neural-network-output-signal can be provided to an additional multiplier-block (not shown) to perform the required multiplication operation of the neural-network-output-signal with the interference-cancelled-signal, or input-signalling, to provide an output-signal.

Whether the signal processor uses the neural network block 316 to compute an interference reduced signal directly, or indirectly such as by way of a gain function, the output from the signal processor can provide an advantageous improvement in interference removal or reduction with respect to the input-signalling.

Figure 4:
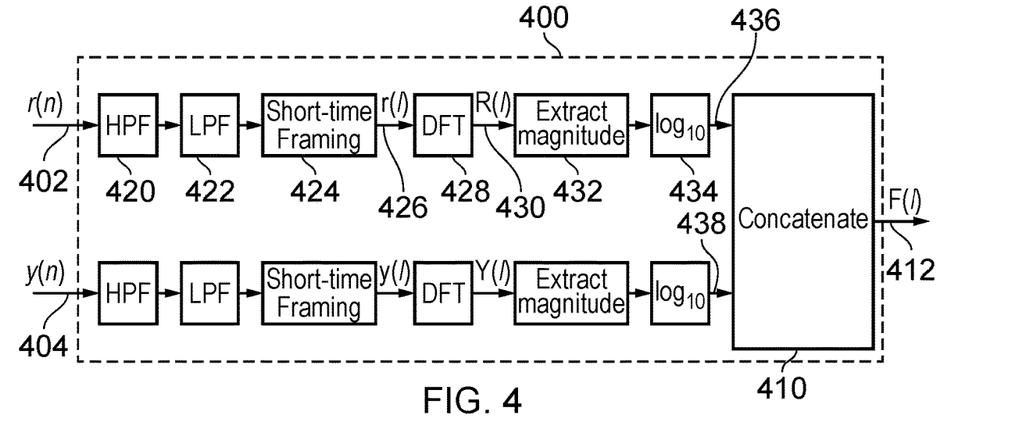
FIG. 4 shows an example embodiment of a feature block that generates a combined signal from an interference-cancelled-signal and an interference-estimate-signal.

FIG. 4 shows a feature block 400 that is one example embodiment of the feature block discussed above in relation to FIG. 3. The feature block 400, which can also be called a feature extraction module, can compute temporal and/or spectral features from a residual signal r(n) 402 and an echo estimate signal y(n) 404. As discussed above, these signals are provided as input signals to the feature block 400. Features of both the residual signal r(n) 402 and the echo estimate signal y(n) 404 are concatenated by a concatenation block 410 to provide a combination-feature-signal F(I) 412. The combination-feature-signal 412 includes input features F(I) that can be provided as an input signal to a neural network block (not shown).

The combination (in this example concatenation) of information from the residual signal r(n) 402 and the echo estimate signal 404 y(n) into the combination-feature-signal F(I) 412, and then it's subsequent use by the neural network block, is a significant step of the present disclosure. In this way, the neural network block can benefit from:
- the residual signal r(n) 402, which can provide a cleaner starting point (containing less echoes or interference) compared to an original microphone signal that forms an input to the entire signal processor, and
- the echo estimate signal y(n) 404, which can serve as a high-quality interference estimate.

In some examples, using the residual signal r(n) 402 and an interference-estimate-signal can remove the need for a separate reference signal such as the echo reference signal x(n) of FIGS. 1 and 2.

Advantageously, the combination of both signals r(n) 402, y(n) 404 can enable the neural network to learn a performant and generalizable residual echo suppression model, that can map the residual signal r(n) 402 features into desired echo-free signal features in an improved way.

In this embodiment, the computed features consist of the logarithm of the short-time spectral magnitudes of both the residual signal r(n) 402 and the echo estimate signal y(n) 404, as obtained from a windowed discrete Fourier transform (DFT). The signal processing chain is similar for both the residual signal r(n) 402 and the echo estimate signal y(n) 404, and will therefore only be described here in relation to the residual signal r(n) 402. The skilled person will readily appreciate that some blocks in the signal processing chain are optional, or can be implemented in different ways in order to achieve the same result. For instance, a functionality of a high-pass-filter block and a low-pass-filter block could be combined into a band-pass-filter block.

The feature block 400 includes a high-pass-filter block 420 and a low-pass-filter block 422 that filter the residual signal r(n) 402, and a downstream short-time framing block 424 that frames the filtered signal into a temporal frame signal r(I) 426 that includes a succession of temporal frames.

The feature block 400 also includes a discrete Fourier transform block 428 that transforms the temporal frame signal r(I) 426 into a frequency-domain frame signal R(I) 430, and an extract magnitude block 432 that determines the magnitudes of the frequency-domain frame signal 430. Then a log-block 434 processes the output of the extract magnitude block 432 to provide a clean-signal 436 that is representative of the residual signal r(n) 402. Finally, the concatenation block 410 combines the clean-signal 436 with a similarly processed noise-signal 438 (which is representative of the echo estimate signal y(n) 404).

This feature computation and combination by the concatenation block 410 results in a combination-feature-signal 412 that includes a feature vector F(l) for each time frame with a frame index l. Each feature vector F(l) can then be provided, as an input to a neural network block (not shown), in a temporally ordered sequence.

In some examples, the combination-feature-signal F(l) 412 can be augmented with features derived from neighbouring/other frames, in order to present features with some temporal context at the input of the neural network. Neighbouring or other frames that relate to a time before the temporal frame signal r(I) 426 can be referred to as earlier-signal-frames. Neighbouring or other frames that relate to a time after the temporal frame signal r(I) 426 can be referred to as later-signal-frames. Inclusion of information from one or more earlier-signal-frames and/or one or more later-signal-frames in the combination-feature-signal F(l) 412 can be advantageous. For example, this can allow the neural network to model and recognize short-term temporal dependencies in the features and exploit these to improve the prediction of echo-free spectral features when determining prediction output signals $\hat{T}(l)$.

In another embodiment (not shown), a combination-feature-signal can simply consist of the raw time-domain signal sample values of the residual signal r(n) and the echo estimate signal y(n). In this case, the extraction of discriminating features can be part of the learnt neural network model.

In another embodiment (not shown), for a multi-microphone case, each microphone can yield a residual signal r(n) and an echo estimate signal y(n) after passing through parallel adaptive AEC modules. In such cases, temporal and/or spectral features can be computed from each residual signal r(n) and from each echo estimate signal y(n). Features of the residual signals r(n) and the echo estimate signals y(n) can then be combined to serve as input to the neural network model.

In some examples, the feature-block 400 can include a feature pre-processing block that processes the combination-feature-signal F(I) 412 that is shown in FIG. 4 to provide a processed-combination-feature-signal. For example, the feature pre-processing block may apply mean-and-variance normalization per feature dimension of the combination-feature-signal F(I) 412. Then, the processed-combination-feature-signal is passed through a multi-layered neural network (not shown) with model parameters that can be provided off-line as described herein in relation to FIG. 3.

Figure 5:
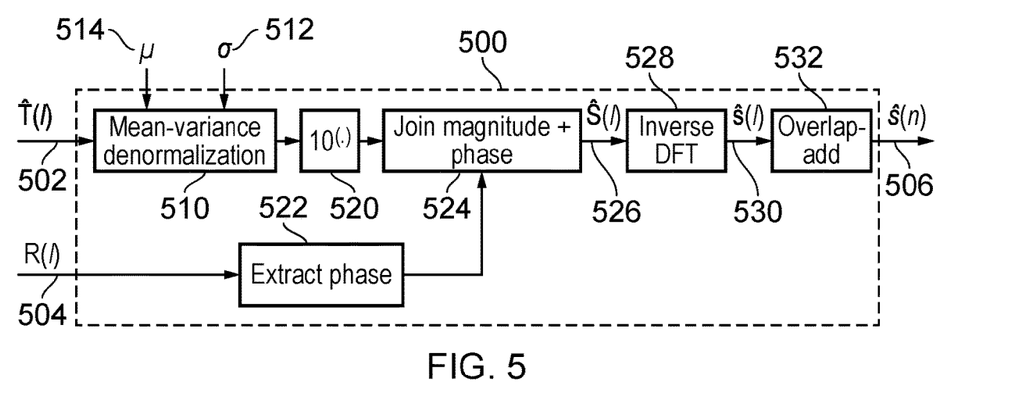
FIG. 5 shows an example embodiment of a synthesis block that can generate an echo free speech signal from an interference-cancelled-signal and an estimated-clean-signal.

FIG. 5 shows a signal synthesis block 500, which is an example embodiment of the signal synthesis block discussed above in relation to FIG. 3. For each frame supplied to a neural network block (not shown), the neural network model computes prediction output features $\hat{T}(l)$ 502 which are provided to the signal synthesis block 500 as an input signal. A residual signal R(l) 504, which in this example is a frequency-domain frame signal (which relates to the same signal frame as the prediction output features $\hat{T}(l)$ 502), is also provided to the signal synthesis block 500 as an input. In this embodiment, the prediction output features $\hat{T}(l)$ 502 and the residual signal R(l) 504 are used to synthesize an echo-free time-domain signal $\hat{s}(n)$ 506 as an output of the signal synthesis block 500.

The signal synthesis block 500 includes a denormalizing block 510 that denormalizes the prediction output features $\hat{T}(l)$ 502 by multiplying them by an overall standard deviation a 512 and then adding an overall mean $\mu$ 514 to the result. The overall standard deviation $\sigma$ 512 and the overall mean $\mu$ 514 can be calculated as described below. During normalization, each input feature dimension in F(I) can be normalized by subtracting the feature mean and dividing the result by the feature standard deviation. Typically, these means and standard deviations can be computed over the vast set of features F(I) that are seen during the training stage. During denormalization, each prediction output feature dimension in T(I) can be denormalized by multiplying with the target standard deviation and adding the target mean to the result. Typically, these means and standard deviations are computed over the vast set of echo-free target features T(I) that are seen during the training stage. For both normalization and denormalization, it could be possible to estimate or finetune the means and variances online.

An example scenario for online fine-tuning can be the situation where the features F(I) observed at inference time show large differences in average level or variance compared to the features observed at training time, on which the overall standard deviation $\sigma$ and the overall mean $\mu$ were computed. In such cases, it can be beneficial to compute a new mean and standard deviation or to fine-tune the overall mean and standard deviation based on, for example, a previous batch of features F(I) observed during inference. Normalization using this new mean and standard deviation, rather than the overall mean and standard deviation, can ensure the features F(I) are scaled appropriately prior to applying the neural network model. This can be referred to as adaptive feature normalization.

In this way, the denormalizing block 510 can account for any normalization that may have been applied by a feature pre-processing block in the feature-block, as discussed above. The performance of normalization and denormalization at inference time can be appropriate because the same operations may have been performed at training time. The reason to perform these operations at training time is because the neural network training procedure can be much more efficient when working with zero mean and unit variance features and targets.

A spectral magnitude block 520 forms predicted Discrete Fourier Transform (DFT) spectral magnitudes from the output of the denormalizing block 510 by performing an operation that is an inverse to the operation performed by the log-block discussed above in relation to FIG. 4. A phase block 522 determines DFT phases by analysing the residual signal R(I) 504.

The signal synthesis block 500 also includes a joining block 524, which forms a speech spectrum estimate $\hat{S}(l)$ signal 526 by combining: (i) the predicted DFT spectral magnitudes from the spectral magnitude block 520, with (ii) the DFT phases from the phase block 522. The speech spectrum estimate signal 526 includes a set of DFT spectral coefficients $\hat{S}(l)$. Then an inverse DFT block 528 applies an inverse DFT transform to the speech spectrum estimate $\hat{S}(l)$ signal 526 to transform it to the time-domain and generate a speech estimate frame signal $\hat{s}(l)$ 530. An overlap-add block 532 then synthesizes an estimated-clean-signal $\hat{s}(n)$ 506, which is an un-framed time domain signal, from the speech estimate frame signal $\hat{s}(l)$ 530 by applying overlap-add processing.

In some examples (not shown) the signal processor can include an optional speech-block that receives the estimated-clean-signal $\hat{s}(n)$ 506. The speech-block can use the estimated-clean-signal $\hat{s}(n)$ 506 to generate a desired speech-feature-signal, that represents one or more features of an undistorted part of a speech signal received by the signal processor. A stream of such speech-feature-signals can be provided to an ASR system, for example, to enable improved speech recognition functionality.

In another embodiment (not shown), the speech spectrum estimate $\hat{S}(l)$ 526 can be used to compute a spectral gain function to be applied to the residual signal spectrum R(l) 504, in order to generate an echo-free time-domain signal $\hat{s}(n)$ 506.

In a further still embodiment (not shown), the predicted echo-free features $\hat{T}(l)$ 502 can be transformed to a set of desired features at the input of an automatic speech recognition system, with the special case of feeding the predicted echo-free features $\hat{T}(l)$ directly to the ASR system.

It will be appreciated that the present disclosure can be applied to the problem of acoustic feedback cancellation, where there is a direct feedback loop from a microphone signal to a loudspeaker playback signal. In this case, the desired signal (s(n)) and the interference signal (e(n)) can be correlated. In contrast, for acoustic echo control problems the desired signal (s(n)) and the interference signal (e(n)) can be uncorrelated. Either way, the same approach of applying a data-driven neural network model to the combination/concatenation of a residual signal (r(n)) and an interference (feedback) estimate signal (y(n)) feature can also successfully be applied to both acoustic feedback cancellation problems and acoustic echo control problems.

Also, it will be appreciated that the present disclosure can be applied to the problem of noise suppression, where the interference cancellation stage delivers an interference-cancelled signal r(n) which is a de-noised version of the input signal(s), and the interference estimate signal y(n), which is an estimate of the noise interference. In the case of single-microphone noise suppression, the interference cancellation stage can consist of a stationary noise estimation procedure such as, for example, tracking the minimum of the noisy speech power in each of a plurality of frequency bins and subtracting this estimate from the noisy speech. In the case of multi-microphone noise suppression, the interference cancellation stage can consist of a beamforming procedure, in which multiple microphone signals are combined to form an interference-cancelled signal r(n) with spatial directionality towards the desired speech, or signal source, direction, and an interference estimate signal y(n) with spatial directionality away from the desired speech, or signal source, direction. In case the desired speech, or signal source, direction is static and known, a fixed beamforming system can be used where the beamformer filters are designed a priori using any state-of-the-art technique. In case the desired speech, or signal source, direction is unknown and/or changing over time, an adaptive beamforming system can be used, in which filter coefficients are changed regularly during operation to adapt to the evolving acoustic situation, using, for example, a generalized sidelobe canceller (GSC) beamformer structure. Either way, the same approach of applying a data-driven neural network model to the combination of the interference-cancelled signal r(n) and the interference estimate signal y(n), for the purpose of noise suppression and/or signal enhancement, can be successfully applied. That is, a beamformer is an example of an interference-cancellation-block. The beamformer may or may not be adaptive.

Figure 6:
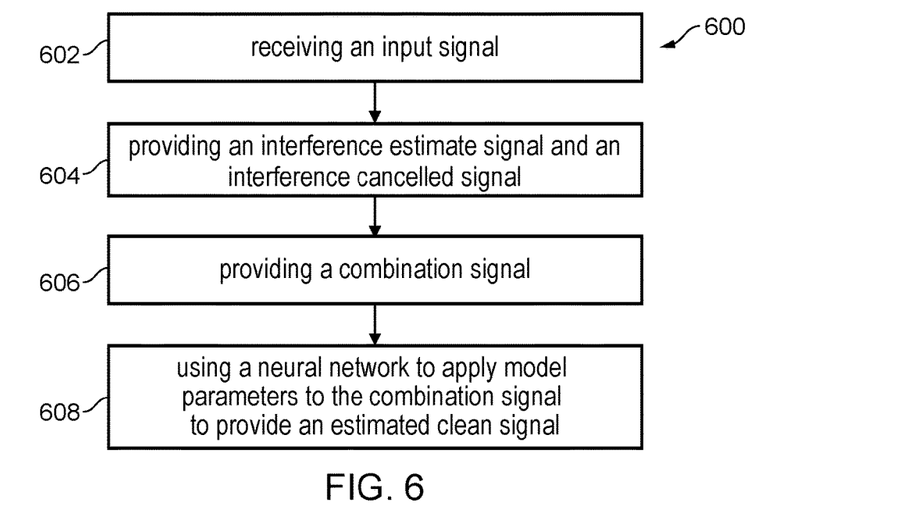
FIG. 6 shows an example embodiment flowchart for a method of signal enhancement.

FIG. 6 shows a flowchart of a method of performing signal enhancement. The method includes a first step 602 of receiving an input-signal (z(n)). The input signal can be a signal representative of speech combined with interference, such as echo, signals.

A second step 604 includes providing an interference-estimate-signal (y(n)) and an interference-cancelled-signal (r(n)) based on the input-signal (z(n)). The interference-estimate-signal (y(n)) represents a first estimate of the interference/echo signal. The interference-cancelled-signal (r(n)) represents a first estimate of a clean signal with the interference removed, or at least reduced. In some examples an adaptive echo cancellation stage (AEC), such as the one illustrated in FIG. 3, can perform the second step 604. In other examples, the second step 604 can be performed by a beamformer, as discussed above.

A third step 606 includes providing a combination-feature-signal (F(l)) based on the interference-cancelled-signal (r(n)) and the interference-estimate-signal (y(n)). The combination-feature-signal (F(l)) may be generated by concatenation of signals equivalent to, or representative of features of, the interference-cancelled-signal (r(n)) and the interference-estimate-signal (y(n)). In some examples a feature-block, such as the ones illustrated in FIGS. 3 and 4, can perform the third step 606.

A fourth step 608 includes using a neural-network to apply model parameters to the combination-feature-signal to provide an estimated-clean-signal (ŝ(n)). When the neural-network model parameters have been appropriately selected, the estimated-clean-signal (ŝ(n)) will contain less interference than the interference-cancelled-signal (r(n)) and thereby provide an improved, more accurate, representation of the desired clean signal (s(n)). In some examples a neural network block and optionally a signal synthesis block, such as the ones illustrated in FIG. 3, can perform the fourth step 608.

Returning again to FIG. 3, the following disclosure provides greater detail about possible examples of the training procedure 374 that can be used to determine the neural network model parameters 304 that can be used as part of the method disclosed above in relation to FIG. 6.

The neural network model parameters 304 can be determined by comparing a plurality of signal pairs from the database 370, each of the signal pairs including: (i) an input-feature-signal, that contains a combination of a training-interference-estimate-signalling and a training-interference-cancelled-signal; and (ii) an output-feature-signal representative of a desired-neural-network-output-signal. By modifying a succession of sets of model parameters in order to reduce the difference between the output of the neural network and the output-feature-signal, the effectiveness of the neural network can be improved.

Thereby, a residual echo suppression model can be learnt to predict the echo-free spectral features on a large and diverse multi-condition dataset stored in the database 370.

An off-line model training procedure can be supervised and data-driven; that is, it can use a large set of aligned noisy/echo-free input-output feature pairs {F(l),T(l)} from the multi-condition speech database 370 to find optimal, or at least advantageous, neural network model parameters θ* 304. The feature pairs can be normalized to zero mean and unit variance per feature dimension by subtracting an overall mean and dividing the result by an overall standard deviation.

In this embodiment, the optimal or advantageous neural network parameters θ* 304 can be found through solving a constrained optimization problem, $$\theta^* = \underset{\theta}{\mathrm{argmin}} J(\theta),$$

where the loss function J(θ) to be minimized is the prediction error between a prediction $\hat{T}(l)$ made by the neural network in training and the known target T(l) summed over all $N_f$ frames in the speech database, $$J(\theta) = \sum_{l=1}^{N_f} \lambda(T(l), \hat{T}(l)) = \sum_{l=1}^{N_f} \lambda(T(l), f_\theta(F(l))),$$

and where the selected per-frame error function λ is the mean-squared error over all predicted variables, such as $$\lambda(T(l),\hat{T}(l))=\|T(l)-\hat{T}(l)\|_2^2.$$

During training, the optimization problem is solved by iteratively adapting the set of parameter values θ for each incoming batch of feature pairs. To this end, a first-order gradient-based optimization method can be used. The full dataset is seen multiple times and in randomized fashion, where each full pass over the dataset is called an epoch. Training can be stopped if either the predefined maximum number of epochs is reached, or if the improvement in the loss function between successive epochs falls below a predefined threshold. An additional stopping criterion can be to stop training when the loss function over a held-out validation dataset has stopped decreasing over a predefined number of most recent epochs. The resulting optimized set of neural network parameters θ* 304 can be stored for usage when the signal processor 300 is operationally deployed.

In another embodiment, a residual echo suppression model can be learnt to optimally, or advantageously, predict an ideal gain function G(l), to be applied to the residual feature values in order to obtain the echo-free spectral features. Model training can be applied on input-output feature pairs {F(l),G(l)} as described above.

The database 370 used in training the neural network can consist of aligned pairs of clean speech (echo-free) and noisy speech (including echoes or other types of interference) and can be used to train the neural network during an off-line procedure. Carefully constructing the database 370 can be an important part of the process to enable the signal processor 300 to perform well for all expected echo/interference suppression scenarios. The database 370 can be constructed to cover multiple conditions, spanning the expected variability in conditions that can be encountered by the signal processor 300 when in use. Examples of different conditions can include any one or more of the following possibilities.

Multiple talkers: speech recordings of multiple different talkers can ensure a variability in gender, pitch, age, languages and accent types.

Multiple echo types: recordings of multiple different echo signals can ensure a variability in content ranging from music playback, alarm sounds, far-end talkers, and/or text-to-speech voices.

Multiple speech-to-echo mixing ratios: synthetic mixing of speech and echo signals can be performed at different speech-to-echo ratios (SER), potentially spanning the whole spectrum from echo-free clean speech (+∞ dB SER) to echo-only (−∞ dB SER), or any selected subset of this SER range.

Multiple devices: recordings of echoes on multiple devices ensure a variability of loudspeaker and microphone characteristics, and nonlinear behaviours.

Multiple rooms: recordings performed in different rooms ensure a variability of acoustic room impulse responses.

For each of the above described variable conditions, it is possible that the scenario is static and known a priori, for example, it may be known that a specific user will be the talker, or that a specific alarm sound will be the echo/interference signal, that the echo suppression rule is to be specifically designed for a given device and/or to be used in a given room. In these cases, the database for training can be constrained to contain only recordings corresponding to these particular scenario(s).

The present disclosure proposes a neural network based system for performing residual echo suppression, that is, to perform a speech (or other signal) enhancement task. Such signal processors are trained to predict the clean spectral values directly which can result in less speech attenuations than other approaches, which is an important goal for speech enhancement tasks. Other approaches may use a microphone signal and additional signals originating from an echo cancellation system jointly for the specific problem of training an automatic speech recognition system. Such other systems look at a completely different problem of recognizing words, and use word and phoneme labels as targets during training. This can result in an entirely different system. Moreover, such other systems may seek to perform an ASR task with more robustness, to the presence of echoes, by adding echo-related signals at its input. In contrast, the present system provides a novel way of suppressing residual echoes directly, and delivering speech signals at the output with significantly reduced residual echo levels.

Signal processors of the present disclosure can directly predict the clean spectral values of a corrupted signal by using the combination or concatenation of the residual spectral values with echo estimate spectral values as input features for a neural network. These processors use a neural network directly to perform residual echo suppression and for this task use different input signals than other methods, thereby exploiting the output signals of a preceding linear/non-linear AEC stage. Moreover, with clean speech spectra as the training target the present method allows a neural network to build up a speech modelling capacity, which can result in considerably less speech attenuations at the output than other methods. Other methods may use a neural network to model the relationship between the echo reference spectral values and the residual echo magnitude spectrum. In such cases, the neural network solely performs the task of residual echo estimation. The suppression of the estimated residual echoes may be performed using a traditional Wiener gain rule. Such approaches do not try to, or allow in any way to, model speech, as the neural network is solely trained on pairs of echo reference and residual echo spectral values.

According to the present disclosure, the application of a neural network as a residual echo suppression stage can be used to model a nonlinear relationship between: (i) a linear echo estimate signal; and (ii) a predominantly nonlinear residual echoes, which an AEC may fail to model accurately. This interaction between a linear model used to solve the linear part of the problem, and a nonlinear (neural network) model used to solve the nonlinear part is highly suitable for the problem of acoustic echo reduction. There is no such interaction in certain other approaches to noise suppression problems. For example, other approaches may use a deep neural network to perform noise suppression by predicting clean spectral magnitudes based on noisy spectral magnitudes. In such approaches, the input features are computed using the noisy microphone signal directly. This approach would perform poorly in typical speakerphone echo suppression settings because the speech-to-echo ratios in such cases are very low.

The proposed neural network based residual echo suppression system can be used in speech communication systems, front-ends for automatic speech recognition (ASR) systems, and hearing assistive devices. In all these systems, acoustical echoes and feedback can arise due to the coupling between the loudspeaker(s) and the microphone(s) of the device. In speech communication systems, such audible acoustic echoes are perceived as annoying and can degrade the quality and intelligibility of the transmitted speech signal. In speech recognition systems, the presence of acoustic echoes can significantly degrade the performance of the ASR or keyword recognition system. These undesired effects of residual echoes can be reduced by using the proposed neural network approach.

Embodiments of the present disclosure can overcome the problems and disadvantages described previously. A neural network can be trained in a data-driven fashion to learn a direct mapping from a residual signal to a desired echo-free speech signal. In one embodiment, the neural network input feature vector consists of a concatenation of the spectral coefficients of the AEC residual signal and the spectral coefficients of the AEC echo estimate signal. The target features during neural network training can consist of the spectral coefficients of the echo-free speech signal. The advantages of the proposed approach are at least threefold:

Improved desired speech preservation;
Improved modelling and suppression capacity of nonlinear echoes; and
Improved robustness to challenging SER conditions.

It will be appreciated that examples of the signal processors of the present disclosure can be provided as integrated circuits or as computer software.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A speech signal processor for performing signal enhancement, the signal processor comprising:
    an input-terminal, configured to receive an input-signaling;
    an output-terminal;
    an interference-cancellation-block configured to receive the input-signaling and to provide an interference-estimate-signaling and an interference-cancelled-signal based on the input-signaling;
    a feature-block configured to provide a combination-feature-signal based on the interference-cancelled-signal and the interference-estimate-signaling;
    a neural-network-block configured to apply model parameters to the combination-feature-signal to provide a neural-network-output-signal to the output-terminal;
    a synthesis block configured to receive the neural-network-output-signal and the interference-cancelled-signal and to provide a reduced-interference-signal to the output-terminal based on magnitudes of the neural-network-output-signal and on phases of the interference-cancelled-signal.

2. The signal processor of claim 1, wherein the feature-block is configured to determine the combination-feature-signal by concatenating:
    a noise-signal representative of the interference-estimate-signaling; and
    a clean-signal representative of the interference-cancelled-signal.

3. The signal processor of claim 2, wherein:
    the noise-signal comprises spectral coefficients of the interference-estimate-signaling; and
    the clean-signal comprises spectral coefficients of the interference-cancelled-signal.

4. The signal processor of claim 1, wherein the neural-network-output-signal comprises an estimated-clean-signal or may represent a gain function or underlying clean signal features.

5. The signal processor of claim 1, wherein the interference-cancellation-block comprises an echo cancellation block or a beamformer.

6. The signal processor of claim 1, wherein the interference-estimate-signaling and the interference-cancelled-signal are both time-domain signals.

7. The signal processor of claim 1, wherein the input-signaling comprises a signal-frame, and the feature-block is configured to determine the combination-feature-signal for the input-signaling based on information representative of:
    one or more earlier-signal-frames; and
    one or more later-signal-frames.

8. The signal processor of claim 1, further comprising a second-input-terminal configured to receive a second-input-signal, wherein the interference-cancellation-block is configured to provide both the interference-estimate-signaling and the interference-cancelled-signal based on both the input-signaling and the second-input-signal.

9. The signal processor of claim 1, further comprising a second-input-terminal configured to receive a second-input-signal, wherein:
    the interference-cancellation-block is configured to determine a second-interference-estimate-signaling and a second-interference-cancelled-signal based on the second-input-signal; and
    the feature-block is configured to provide the combination-feature-signal by combining signaling representative of:
        the interference-estimate-signaling;
        the interference-cancelled-signal;
        the second-interference-estimate-signaling; and
        the second-interference-cancelled-signal.

10. The signal processor of claim 1, wherein the model parameters are pre-determined based on a comparison of a plurality of signal pairs, each signal pair comprising:
    an input-feature-signal, comprising training-interference-estimate-signaling and a training-interference-cancelled-signal; and
    an output-feature-signal representative of a desired-neural-network-output-signal.

11. The signal processor of claim 10, wherein the plurality of signal pairs comprise signal pairs representative of one or more of:
    speech signals provided by one or more talkers;
    one or more types of interference signals;
    one or more ratios between clean-signals and interference-signals;
    one or more electronic audio devices; and
    one or more acoustic environments.

12. The signal processor of claim 1, wherein the input-signaling comprises a speech signal, and the signal processor further comprises a speech-block configured to provide a desired speech-feature-signal based on the neural-network-output-signal.

13. The signal processor of claim 1, wherein the neural-network-block comprises one or more of:
- a feedforward neural network;
- a recurrent neural network;
- a long short-time memory neural network; and
- a convolutional neural network.

14. The signal processor of claim 1, further comprising a feature pre-processing block that is configured to apply normalization per feature dimension of the combination-feature-signal.

15. The signal processor of claim 1, wherein the input-signaling comprises a signal-frame, and the feature-block is configured to determine the combination-feature-signal for the input-signaling based on information representative of:
- one or more earlier-signal-frames.

16. The signal processor of claim 1, wherein the input-signaling comprises a signal-frame, and the feature-block is configured to determine the combination-feature-signal for the input-signaling based on information representative of:
- one or more later-signal-frames.

* * * * *